UNITED STATES PATENT OFFICE.

JOHN P. KINNEY, OF BROOKLYN, NEW YORK.

IMPROVEMENT IN PROCESSES FOR PURIFYING AND PRESERVING ANIMAL FATS.

Specification forming part of Letters Patent No. 169,008, dated October 19, 1875; application filed September 24, 1875.

*To all whom it may concern:*

Be it known that I, JOHN P. KINNEY, of the city of Brooklyn, county of Kings and State of New York, have invented or discovered a new, useful, and Improved Mode of Purifying and Preserving Animal Fats, and utilizing and manufacturing the same into butter; and I do hereby declare that the following is a full, clear, and exact description and specification of my discovery or invention.

The nature of my discovery or invention consists in purifying and preserving animal fats entirely sweet and odorless, and utilizing and manufacturing the same into butter.

To enable others skilled in the art to make and use my discovery or invention, I will now proceed to describe the same.

First, in ten (10) gallons of water dissolve three (3) pounds of common salt and four (4) ounces of soda-ash. (The proportions of my ingredients may be increased or diminished according to the quantity of fat I desire to treat.) Then boil the admixture in a suitable vessel by hot-air, or steam pipes, or any other suitable means. When the ingredients are thoroughly dissolved by this process, a scum arises at the top, which I then skim off carefully, and add one hundred (100) pounds of animal fat cut in small pieces, keeping the mass well agitated until the whole is thoroughly melted, when I again skim the mass carefully. Then draw the oil off through a filter into cold water, which must be well agitated, until the oil is cool enough to be removed. Second, the fat, as purified by the first step of my process, is then put into a second solution, consisting of about four or five (4 or 5) gallons of water, about two (2) pounds of bicarbonate of potassa, and about two (2) pounds of salt. It is then heated and kept agitated until it becomes thoroughly melted. Then draw the oil off again through a filter into cold water, keeping it well agitated until the fat becomes cold; then thoroughly remove from it the water contained therein; the fat will then assume an entirely pure, sweet, and odorless condition.

It will be observed that my process consists in two separate steps—the first being to purify or remove all impurities from the fatty matter, and the second to make it perfectly neutral and sweet.

To utilize and manufacture the fat thus prepared into butter, I place the fat in any suitable churn, with rotary beaters revolving not less than ninety (90) to one hundred (100) times per minute, and agitate the same till it becomes an entire foamy mass, to which add sweet cream in the proportion of one-third, and continue to agitate the same till the whole becomes a foamy mass, when it will have all the general characteristics of natural butter. Then take the butter from the churn, salt to suit taste, and pack it in the ordinary manner for market.

I am aware that it is not new to churn by itself a suitably-prepared oil obtained from animal fats; also, that it is not new to churn a suitably-prepared oil, and then combine the product thus obtained with cream or butter already formed upon cream, the oil product being placed in a churn and churned until a thorough amalgamation is effected, as this is claimed in the patent granted to W. E. Andrews August 24, 1875, No. 166,955. I am also aware that it is not new to extract the fatty matter from fats by adding thereto a caustic alkali, as this is claimed in Van Brunt's patent of October 13, 1874, No. 155,816.

Having thus fully described my discovery or invention, and the manner in which the same is carried out, what I claim as new, and desire to secure by Letters Patent, is—

1. The process herein described for purifying and preserving animal fats, which consists in first purifying the fat by subjecting it to a heated solution of soda-ash and common salt in water, in about the proportions specified; then drawing the oil off and filtering it into cold water, and then subjecting the oil to a second solution, consisting of bicarbonate of potassa and common salt in water; then boiling the mass, and finally filtering the oil off into cold water, substantially as described.

2. The process herein described for manufacturing a suitable product for culinary purposes, consisting in first purifying the fat by subjecting it to a heated solution of soda-ash and common salt in water, in about the proportions specified; then drawing the oil off and filtering it into cold water; then subjecting the oil to a second solution, consisting of bicarbonate of potassa and common salt in water, heating the mass, and finally filtering the oil off into cold water, agitating said oil in a churn until it assumes an entire foamy mass, to which add sweet cream and continue to agitate, substantially as described.

In testimony whereof I have hereunto set my name in the presence of two subscribing witnesses.

J. P. KINNEY.

Witnesses:
   EMIL KLINESMITH,
   BERNARD METZGER.